United States Patent [19]

Barron et al.

[11] Patent Number: 4,460,387
[45] Date of Patent: Jul. 17, 1984

[54] DISCHARGE EVACUATION SYSTEM

[75] Inventors: William R. Barron, McKean; Peter E. Zell, Erie, both of Pa.

[73] Assignee: American Sterilizer Company, Erie, Pa.

[21] Appl. No.: 331,069

[22] Filed: Dec. 16, 1981

[51] Int. Cl.³ .............................................. B01D 19/00
[52] U.S. Cl. ........................................ 55/192; 55/201
[58] Field of Search ................... 55/55, 171, 172, 176, 55/189, 190, 192, 201

[56] References Cited

U.S. PATENT DOCUMENTS

| | | | |
|---|---|---|---|
| 993,343 | 5/1911 | Brewster | 55/189 |
| 1,072,670 | 9/1913 | Strite | 55/192 |
| 1,095,463 | 5/1914 | Kieser | 55/169 |
| 2,340,898 | 2/1944 | Race | 55/189 X |
| 3,059,396 | 10/1962 | Thees | 55/189 |
| 3,306,009 | 2/1967 | Cruse | 55/201 |
| 3,789,584 | 2/1974 | Iwasyk et al. | 55/201 |
| 3,853,500 | 12/1974 | Gassmann et al. | 55/190 X |
| 4,161,395 | 7/1979 | Brown et al. | 55/192 X |

FOREIGN PATENT DOCUMENTS 1426174  2/1976  United Kingdom ................. 55/189

Primary Examiner—Robert H. Spitzer
Attorney, Agent, or Firm—Robert D. Yeager; Andrew J. Cornelius

[57] ABSTRACT

A discharge evacuation system includes a conduit which accepts a fluid discharge containing a liquid discharge and a gaseous discharge. The conduit includes a main outlet through which the liquid discharge flows from the conduit into the discharge side of a plumbing system and a backup outlet through which at least a portion of the liquid discharge flows from the conduit when a predetermined volume of liquid discharge backs up within the conduit. Apparatus is provided for removing at least a portion of the gaseous discharge from the conduit and directing the flow of the portion of the gaseous discharge to an area remote from the area in which the conduit is located.

5 Claims, 8 Drawing Figures

DISCHARGE EVACUATION SYSTEM

BACKGROUND OF THE INVENTION

1. Field of the Invention

The present invention relates to fluid waste disposal and, more specifically, to an evacuation system for accepting a fluid discharge and removing gas from the fluid discharge to an area remote from areas in which personnel are present.

2. Description of the Prior Art

Noxious or irritating gases are used commonly as sterilants in sterilizers. Ethylene oxide, for example, is used in many types of sterilizers and is toxic. Ethylene oxide is removed from the chamber at the conclusion of one type of ethylene oxide sterilization process, mixed with water and disposed of through a plumbing system. Some plumbing codes require that precautions be taken to prevent liquid from the discharge side of the plumbing system from backing up into the sterilizing chamber and contaminating the supply side of the plumbing system when the discharge side of the plumbing system becomes blocked.

U.S. patent application Ser. No. 257,779, filed Apr. 27, 1981, describes a conduit which is adapted to receive liquid flowing through the discharge side of a plumbing system and prevent the liquid from backing up into a sterilizer by diverting a portion of the liquid through a backup outlet when the liquid backs up within the conduit to a predetermined level. The contents of U.S. patent application Ser. No. 257,779, are hereby incorporated herein by reference. Any gas flowing with the liquid can escape from the plumbing system through the backup outlet of the conduit into the area surrounding the sterilizer and cause a health hazard.

Accordingly, it is desirable to provide apparatus for removing and disposing of harmful fluid discharges flowing through a vented plumbing system before gases flowing with the fluid can escape from the plumbing system and present a health hazard. One type of such apparatus separates the liquid from the gas of a fluid discharge by centrifugal action. The separated gas is drawn through an exhaust outlet before it reaches the vented drain through which the liquid flows. After the gas flows through the exhaust outlet, it is removed to another location by a conventional ventilation system. Of course, the separator that separates the gas from the liquid is relatively expensive to acquire, install, operate and maintain.

SUMMARY OF THE INVENTION

When used herein, the term "fluid discharge" shall mean a liquid, a gas, a liquid having gas dissolved in the liquid, a liquid and a gas flowing with the liquid or any combination of the foregoing. When used herein, the term "gaseous discharge" shall mean a gas, a revaporized gas or any combination of the foregoing. When used herein, the term "liquid discharge" shall mean a liquid, a liquid having gas dissolved in the liquid or any combination of the foregoing.

The present invention provides apparatus for accepting and disposing of fluid discharge containing liquid discharge and gaseous discharge. The apparatus prevents the fluid discharge from entering the supply side of the plumbing system into which the fluid discharge is directed when a backup in the discharge side of the plumbing system occurs. At least a portion of the gaseous discharge is removed from the fluid discharge to another location.

The present invention includes a conduit having an inlet through which fluid discharge from apparatus flows into the conduit, a main outlet through which the liquid discharge is directed from the conduit into the discharge side of a plumbing system and a backup outlet through which at least a portion of the liquid discharge flows from the conduit when a predetermined volume of liquid discharge backs up in the conduit to prevent the liquid discharge from contaminating the supply side of the plumbing system. The backup outlet defines an overflow rim over which the liquid discharge flows through the backup outlet when the liquid discharge occupies the predetermined volume. The overflow rim and the outlet define an air gap therebetween that prevents the discharge from coming into contact with the inlet before the discharge flows through the backup outlet over the overflow rim. Further, the present invention includes apparatus for removing at least a portion of the gaseous discharge from the conduit and directing that gaseous discharge to an area remote from those in which personnel are present.

Preferably, the removing apparatus is an exhaust system that draws gaseous discharge from the conduit through at least one exhaust outlet. The removing apparatus can include a nozzle secured to the conduit that is in fluid communication with the exhaust outlet. Gaseous discharge is drawn from the conduit through the exhaust outlet and nozzle by an exhaust blower that creates a negative pressure inside the conduit. The exhaust blower draws air through the backup outlet and into the conduit and, accordingly, draws the air and the gaseous discharge portion from the conduit through the exhaust outlet and nozzle and directs the gaseous discharge portion to an area remote from the area in which the conduit is located.

Accordingly, the present invention is useful for removing from a conduit at least a portion of a gas flowing within the conduit and directing the flow of the gas to an area remote from those in which personnel are present.

BRIEF DESCRIPTION OF THE DRAWINGS

The following detailed description of the preferred embodiments can be understood better if reference is made to the accompanying drawings in which.

DETAILED DESCRIPTION OF THE PREFERRED EMBODIMENTS

Figure 1:
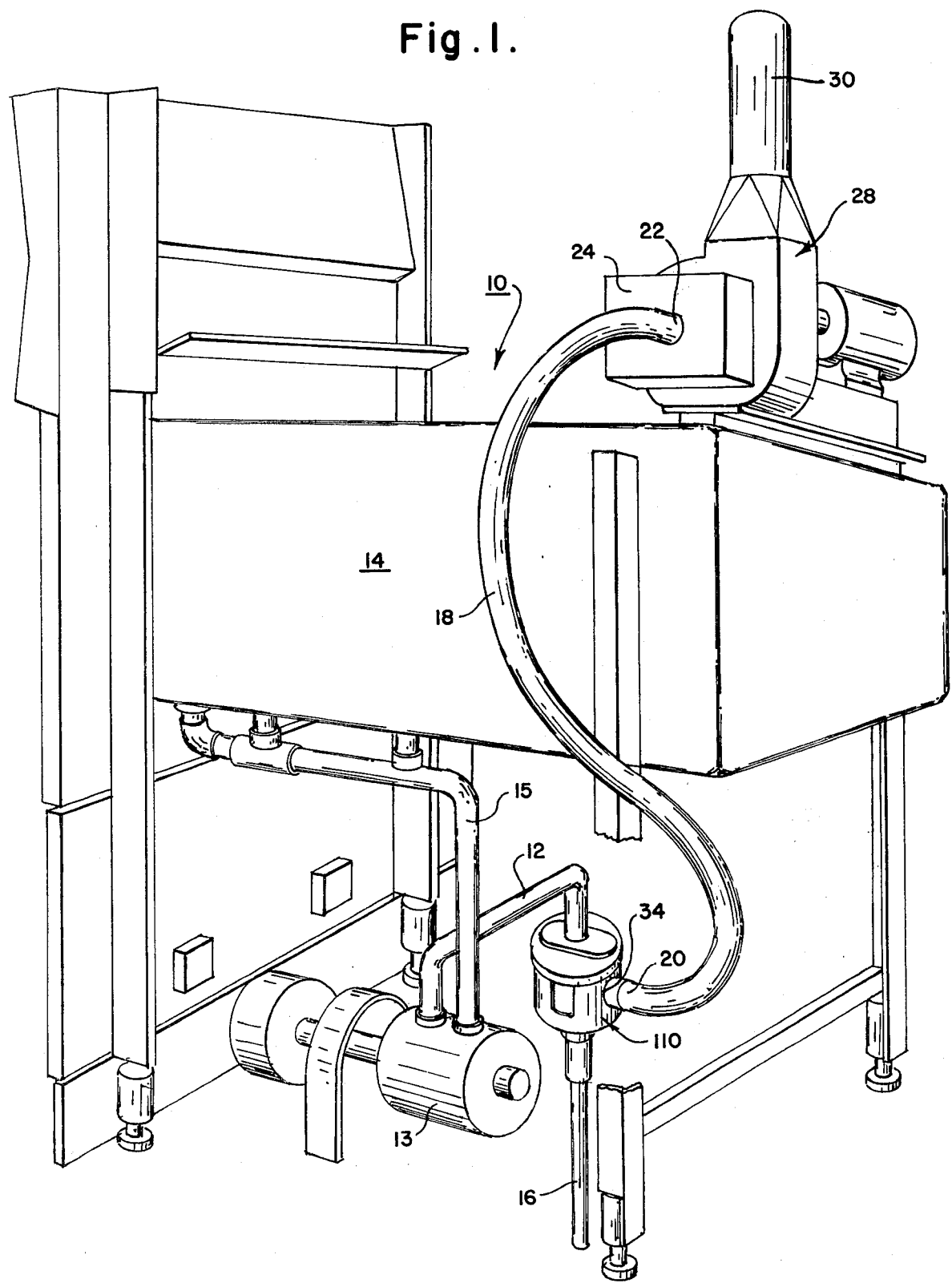
FIG. 1 is an isometric view showing the evacuation system of the preferred embodiment of the present invention along with the sterilizer and pump from which fluid discharge flows.
Figure 2:
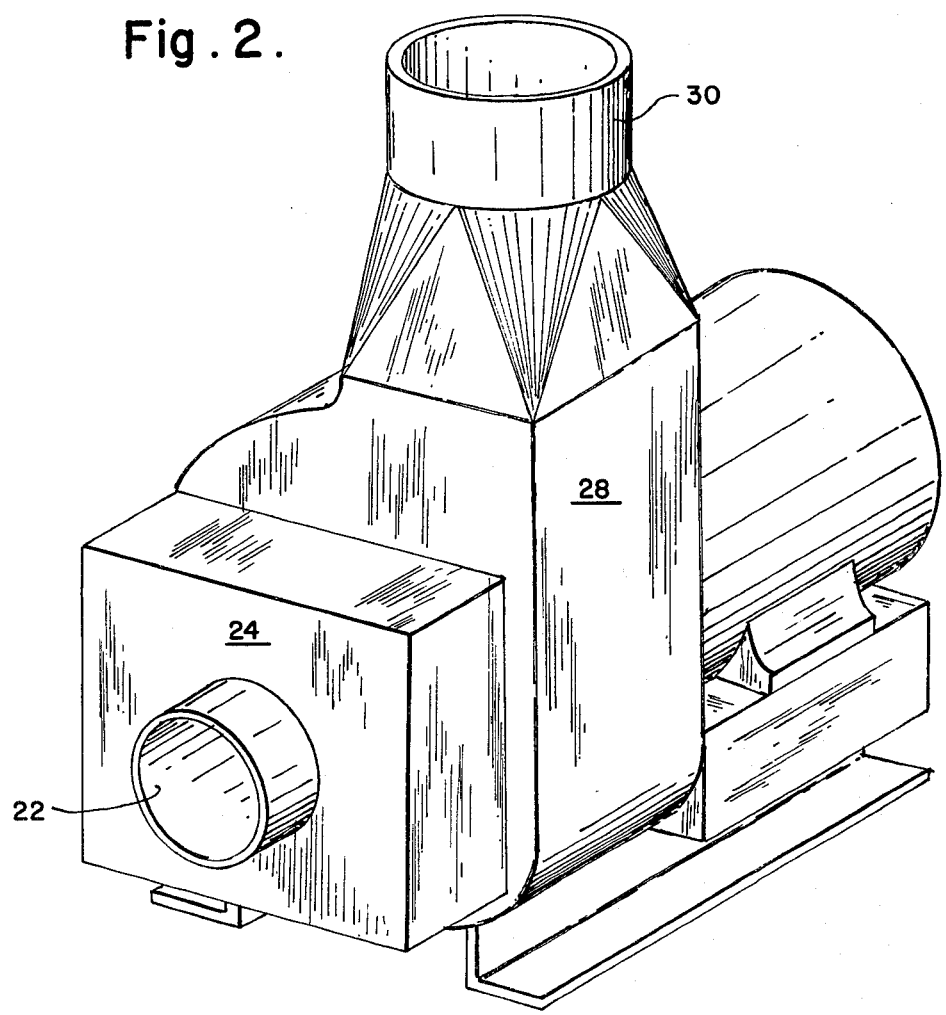
FIG. 2 is an isometric view of the plenum and blower assembly of the system shown in FIG. 1.
Figure 8:
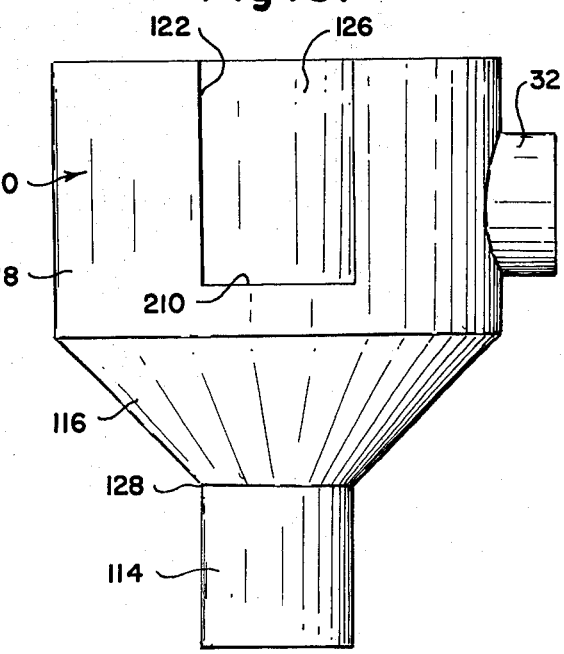
FIG. 8 is a side elevational view of the conduit shown in FIG. 1.

FIGS. 1 and 2 show a discharge evacuation system 10 that is the preferred embodiment of the present invention. Discharge evacuation system 10 is adapted for receiving and disposing of the fluid discharge—composed generally of a liquid discharge and a gaseous discharge—of a sterilizer. Discharge system 10 includes a conduit 110 secured to the discharge pipe 12 of a pump 13. Pump 13 mixes water with the gaseous discharge received from a sterilizer chamber 14 through pipe 15 to create a fluid discharge and directs the fluid discharge through discharge pipe 12 and into conduit 110. Conduit 110, described more fully below, receives fluid discharge from discharge pipe 12 and passes the liquid discharge and at least a portion of the gaseous discharge to pipe 16 and, accordingly, the sewage system. One end 20 of a duct 18 is secured to nozzle 32 (see FIGS. 4 and 8) of conduit 110 and communicates with the interior of conduit 110 through outlet 34 formed in the side of conduit 110. The remaining end 22 of duct 18 is secured to and communicates with the interior of plenum 24 which is secured to an exhaust blower and air pump assembly 28. An adjustable damper (not shown) is disposed within end 22 of duct 18 and is used to vary the rate of flow of gas through duct 18 and the rate of flow of air drawn through openings 120 and 122 of conduit 110 (see FIG. 3). Such flow rates can be varied or controlled also by providing apparatus for adjusting the size of openings 120 or 122 or by changing the capacity of assembly 28. Assembly 28 is in fluid communication with the interior of plenum 24 and provides the negative pressure within conduit 110 necessary to draw gaseous discharge from conduit 110 and through duct 18 and plenum 24. Plenum 24 is used, preferably, only if more than one duct 18 feeds gaseous discharge to assembly 28; otherwise, the remaining end 22 of duct 18 can be connected directly to assembly 28. Assembly 28 disposes of gaseous discharge through duct 30 which is secured to the outlet of assembly 28. Assembly 28 can be mounted conveniently to the top surface of sterilizer chamber 14, as shown in FIG. 1, or at a location remote from sterilizer chamber 14. Plenum 24, assembly 28 and duct 18 can be made of such suitable materials as metal, plastic or rubber.

Figure 3:
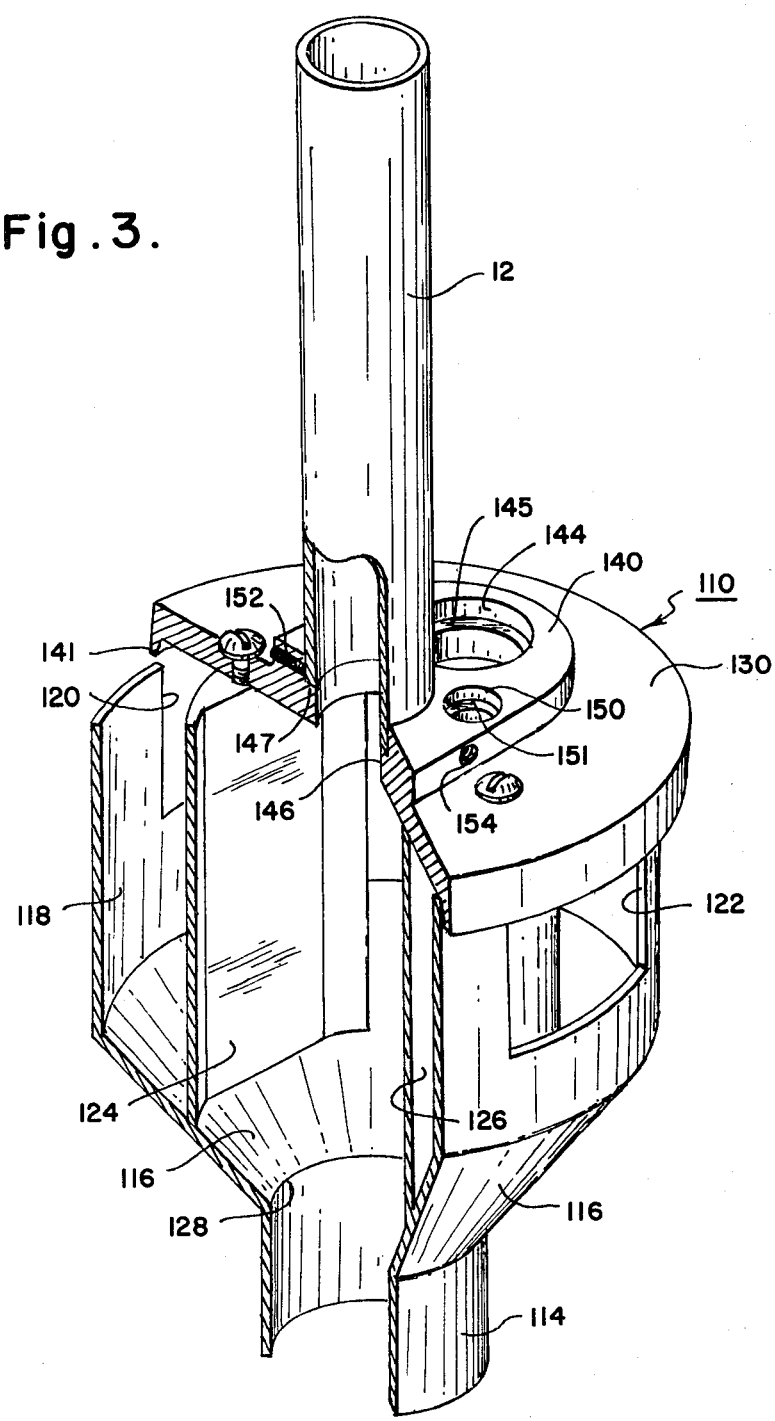
FIG. 3 is an isometric view showing the conduit of the system shown in FIG. 1 secured to the discharge pipe of the pump.
Figure 4:
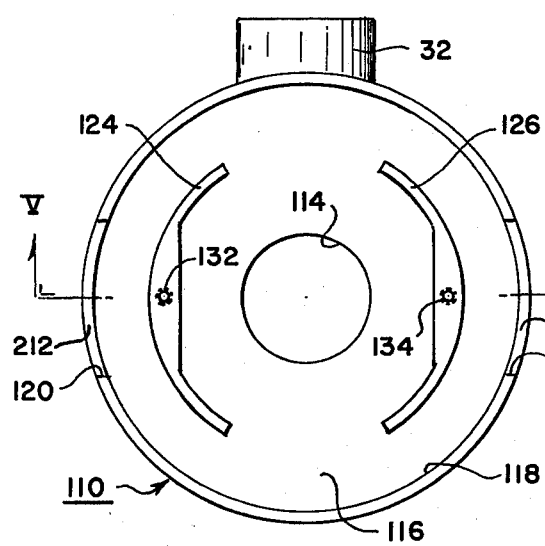
FIG. 4 is a top plan view of the conduit shown in FIGS. 1 and 3 without its cover plate.
Figure 6:
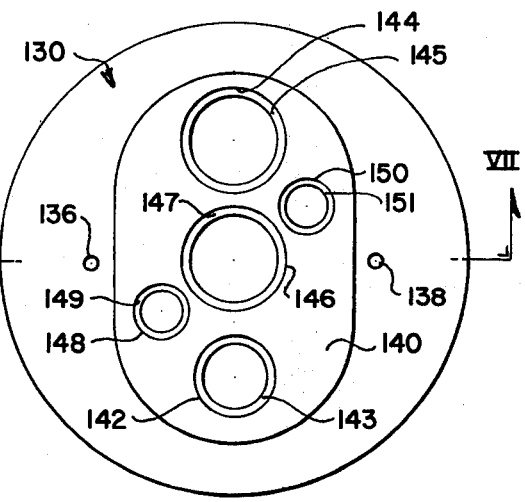
FIG. 6 is a top plan view of the cover plate of the conduit shown in FIG. 3.
Figure 7:
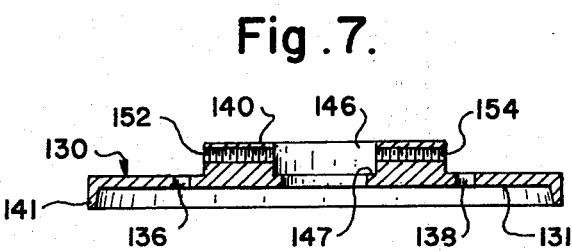
FIG. 7 is a sectional view of the cover plate shown in FIG. 6 taken along the line VII—VII.
Figure 5:
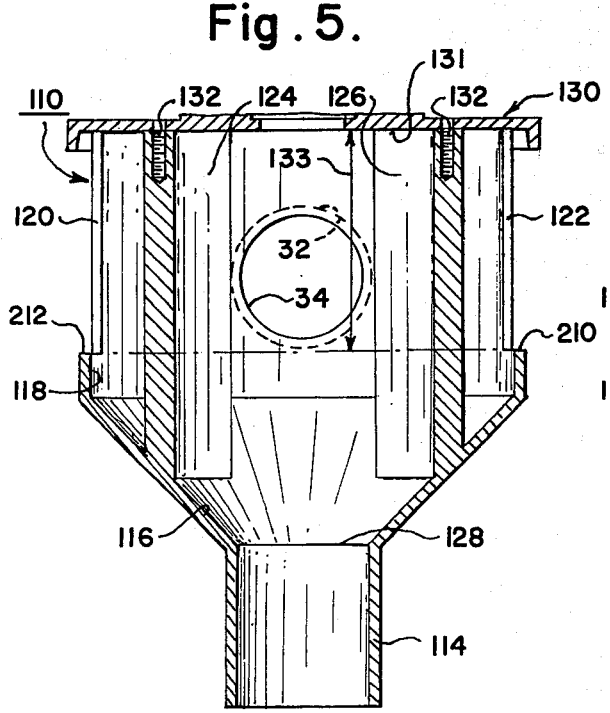
FIG. 5 is a sectional view of the conduit shown in FIG. 4 taken along the line V—V.

The details of conduit 110 are shown in FIGS. 3 through 8. FIG. 1 shows conduit 110 secured to the discharge pipe 12 of pump 13. Conduit 110 can be formed from any suitable material, such as glass-filled nylon. Conduit 110 receives fluid discharge from pump 13 through discharge pipe 12 and directs the liquid discharge to the inlet pipe 16 of the discharge side of the plumbing system. As can be seen in FIGS. 3 through 5, conduit 110 includes an outlet portion 114 which is in fluid communication with inlet pipe 16 and passes fluid discharge to it. In the preferred embodiment, the longitudinal axes of inlet pipe 12 and outlet portion 114 are colinear to provide a direct flow path for liquid through conduit 110. The direct path minimizes splashing within conduit 110 which would enhance the separation of any noxious gases dissolved in the discharge received by conduit 110. Conduit 110 also includes a sloped portion 116 which directs liquid discharge from discharge pipe 12 toward outlet 114. Also, sloped portion 116 accumulates liquid discharge during periods when conduit 110 is not able to pass liquid discharge through inlet pipe 16 to the plumbing system as fast as liquid discharge is introduced through discharge pipe 12 into conduit 110. Cylindrical portion 118 of conduit 110 facilitates mounting of conduit 110 to discharge pipe 12 and aids in retaining within conduit 110 liquid discharge that is deflected from its normal path of travel through conduit 110. A nozzle 32 is secured to the side of conduit 110, or formed integrally therewith, and communicates with the interior of conduit 110 through exhaust outlet 34 which is formed in the side of conduit 110 between backup outlets 120 and 122.

Cylindrical portion 118 defines a pair of backup outlets 120 and 122 which prevent liquid discharge accumulating in conduit 110 from backing up into sterilizer 14 through pipes 12 and 15 and contaminating the supply side of the plumbing system. Outlets 120 and 122 define overflow rims 212 and 210, respectively. When either outlet 114 or the discharge side of the plumbing system becomes blocked and the flow of liquid discharge through the discharge side of the plumbing system is stopped or reduced, liquid discharge begins to accumulate within conduit 110. When the level of the accumulated liquid rises above the overflow rims 212 and 210 of outlets 120 and 122, respectively the accumulated liquid begins to flow through outlets 120 and 122 to the exterior of conduit 110.

Conduit 110 defines an air gap, which is defined as a vertical space between the bottom surface 131 of cover 130 where liquid enters conduit 110 and overflow rims 210 and 212. The air gap is indicated in FIG. 5 as vertical space 133. Air gap 133 ensures that waste will not come into contact with and be suctioned into the supply side of the plumbing system when the discharge side of the system becomes blocked. Preferably, the depth of air gap 133 is at least two times the sum of the diameters of the openings formed by shoulders 143, 145, 147, 149 and 151 to ensure that conduit 110 conforms with the requirements of the Detroit plumbing code pertaining to sterilizers.

Conduit 110 includes a pair of blocking members or baffles 124 and 126 secured to sloped portion 116—or formed integrally therewith—between the normal path of flow of liquid discharge through conduit 110 and outlets 120 and 122. Baffles 124 and 126 partially surround the top portion 128 of outlet 114 and extend from sloped portion 116 to the top of conduit 110 to prevent liquid discharge deflected from its normal path of travel through conduit 110 from passing through outlets 120 and 122. However, liquid discharge accumulating in conduit 110 due to a blockage in the plumbing system can flow around baffles 124 and 126 to cylindrical portion 118 and, when the accumulated liquid rises to a sufficient level, can leave conduit 110 through outlets 120 and 122.

Conduit 110 includes a cover plate 130 which is mounted to the top of conduit 110 and sealed to prevent the flow of fluid between cover plate 130 and the top of conduit 110. Cover plate 130 facilitates mounting conduit 110 to discharge pipe 12 and prevents liquid discharge from leaving conduit 110 through its top. Baffles 124 and 126 include tapped holes 132 and 134 into which threaded screws can be secured through openings 136 and 138 of cover plate 130 to secure cover plate 130 to baffles 124 and 126 and cylindrical portion 118. Cover plate 130 includes a downwardly extending flange 141 that overlaps the top edge of conduit 110 when it is secured in place and facilitates the positioning of cover plate 130 on conduit 110. Also, cover plate 130 includes a raised portion 140 into which a discharge pipe 12 is inserted and sealed to ensure that liquid discharge flowing from pipe 12 flows into conduit 110 and to prevent the flow of fluid between cover plate 130 and the top of cylindrical portion 118. Raised portion 140 includes openings 142, 144, 146, 148 and 150 into at least one of which a discharge pipe 12 is secured and sealed. Openings 142, 144, 146, 148 and 150 include shoulders 143, 145, 147, 149 and 151, respectively. Shoulders 143, 145, 147, 149 or 151 prevent insertion of a properly dimensioned discharge pipe 12 completely through an opening 142, 144, 146, 148 or 150 and into conduit 110.

The choice of which opening to use is dictated by the size of the discharge pipe 12 used. Discharge pipes can be inserted into and sealed within several openings of raised portion 140 to provide controlled discharge from more than one source. Unused openings are plugged and sealed with appropriate plastic inserts. Alternately, a rubber bladder (not shown) can be secured against inside top surface 131 of cover plate 130 to seal unused openings. A discharge pipe 12 is secured in central opening 146 by threading a pair of set screws through tapped holes 152 and 154 until they bear against discharge pipe 12. If only one discharge pipe 12 feeds fluid discharge into conduit 110, discharge pipe 12 should be secured and sealed within an opening in cover plate 130 that is directly above outlet 114 when conduit 110 is installed as shown in FIG. 1. If system 10 is used with a sterilizer having a surge tank, a conduit can be secured to the outlet of the surge tank and secured and sealed within opening 144 of cover plate 130. If it is desired to insert a pipe completely through cover plate 130, the end of the pipe should not be disposed below the top of outlet 34 to ensure optimal functioning of system 10.

Outlet 114 of conduit 110 is placed in liquid communication with the inlet of the discharge side of the plumbing system in any known manner.

What is claimed is:

1. A system for evacuating the fluid discharge of an apparatus, the fluid discharge containing a liquid discharge and a gaseous discharge comprising:
   a conduit defining an inlet through which the fluid discharge flows into said conduit, a main outlet through which the liquid discharge flows from said conduit into the discharge side of a plumbing system and a backup outlet which provides fluid communication between the interior of said conduit and both the exterior of said conduit and the exterior of the plumbing system and through which at least a portion of the liquid discharge flows from the conduit when a predetermined volume of liquid discharge backs up in said conduit;
   said backup outlet defining an overflow rim over which said discharge flows through said backup outlet when said discharge occupies said predetermined volume;
   said overflow rim and said inlet defining an airgap therebetween that prevents said discharge from coming into contact with said inlet before said discharge flows through said backup outlet over said overflow rim; and
   means for removing at least a portion of the gaseous discharge from said conduit and directing the gaseous discharge to an area remote from the area in which said conduit is located to prevent the gaseous discharge from escaping from said conduit through said backup outlet.

2. The system recited in claim 1 wherein said removing means comprises:
   an exhaust outlet defined by said conduit through which said portion of the gaseous discharge can flow from said conduit; and
   means for drawing said portion of the gaseous discharge from said conduit through said exhaust outlet to said remote area.

3. The system as recited in claim 2 wherein said drawing means comprises:
   a nozzle secured to said conduit, the inlet of said nozzle being in fluid communication with said exhaust outlet;
   a hose secured to the outlet of said nozzle having an inlet that is in fluid communication with said nozzle outlet; and
   an exhaust blower assembly having an inlet that is secured to the outlet of said hose and in fluid communication therewith, said exhaust blower being capable of creating a negative pressure at said backup outlet and drawing air and said portion of the gaseous discharge from said conduit through said exhaust outlet and hose.

4. The system recited in claim 1 wherein said gaseous discharge is gaseous sterilant.

5. The system recited in claim 1 further comprising a blocking member secured to the interior surface of said conduit between (i) the normal path of flow of the discharged liquid through said conduit from said inlet to said main outlet and (ii) said backup outlet, to prevent liquid discharge reflected from said normal path of flow from passing through said backup outlet.

* * * * *

UNITED STATES PATENT AND TRADEMARK OFFICE
CERTIFICATE OF CORRECTION

PATENT NO. : 4,460,387

DATED : July 17, 1984

INVENTOR(S) : William R. Barron and Peter E. Zell

It is certified that error appears in the above—identified patent and that said Letters Patent is hereby corrected as shown below:

Col. 6, line 48, delete "reflected" and substitute therefor --deflected--.

Signed and Sealed this

Eighteenth Day of December 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,460,387
DATED : July 17, 1984
INVENTOR(S) : William R. Barron and Peter E. Zell It is certified that error appears in the above—identified patent and that said Letters Patent is hereby corrected as shown below:

In the FOREIGN PATENT DOCUMENTS section of the first page of the patent, insert the new line --1 609 052 3/1970 West Germany-- before "1426174 2/1976 United Kingdom . . . . . . 55/189."

Signed and Sealed this

Sixteenth Day of April 1985

[SEAL]

Attest:

DONALD J. QUIGG

*Attesting Officer*  *Acting Commissioner of Patents and Trademarks*